(12) United States Patent
Burke

(10) Patent No.: US 7,634,870 B1
(45) Date of Patent: Dec. 22, 2009

(54) CYTOKININ ENHANCEMENT OF COTTON

(75) Inventor: John J. Burke, Lubbock, TX (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 164 days.

(21) Appl. No.: 11/639,954

(22) Filed: Dec. 15, 2006

Related U.S. Application Data

(60) Provisional application No. 60/754,411, filed on Dec. 28, 2005.

(51) Int. Cl.
- *A01C 1/00* (2006.01)
- *A01C 1/06* (2006.01)
- *A01G 7/00* (2006.01)
- *A01H 4/00* (2006.01)

(52) U.S. Cl. .................. 47/58.1 SE; 47/5; 47/57.6

(58) Field of Classification Search .............. None
See application file for complete search history.

(56) References Cited

U.S. PATENT DOCUMENTS 5,654,255 A   8/1997   O'Neal et al.

6,815,205 B2   11/2004   Lin et al.

OTHER PUBLICATIONS

Aycock, Barry. Super Start, SUL-15, GS-48 and GS-70. Plant Growth Regulators Carried with Foliar Fertilitzers for Cotton Production. Proceedings of the Beltwide Cotton Conference vol. 1: 71-73 (1999) National Cotton Council, Memphis TN.*
Suttle, Jeffrey C. Cytokinin-Induced Ethylene Biosynthesis in Nonsenescing Cotton Leaves. Plant Physiol. (1986) 930-935.*
Popisilova, J. et al. Cytoknins and Water Stress. Biological Plantarum 43 (3) 321-328 (2000).*

* cited by examiner

*Primary Examiner*—Wendy C. Haas
(74) *Attorney, Agent, or Firm*—John Fado; Randall E. Dekk; Lesley Shaw

(57) ABSTRACT

The growth and development of cotton is enhanced by an application of relatively low concentrations of a cytokinin to cotton seed or to a growing cotton plant at a stage of growth between the cotyledon stage and the six-leaf stage. Application of the cytokinins is effective to elicit one or more effects in the resultant plant including reduced apical dominance, increased rate of development of fruiting branches, decreased time to first bloom, increased number of cotton squares formed, thickening of the hypocotyl, reduced rate of leaf wilting, reduced water usage, and increased root development.

25 Claims, 8 Drawing Sheets

CYTOKININ ENHANCEMENT OF COTTON

CROSS-REFERENCE TO RELATED APPLICATION

This application claims the benefit under 35 U.S.C. 1.19(e) of U.S. provisional No. 60/754,411, filed Dec. 28, 2005, the contents of which are incorporated by reference herein.

BACKGROUND OF THE INVENTION

1. Field of the Invention

The invention is drawn to an improved method for the production of cotton with enhanced growth and yield, and reduced water usage.

2. Description of the Prior Art

Plant growth is affected by a variety of physical and chemical factors. Physical factors include available light, day length, moisture and temperature. Chemical factors include minerals, nitrates, cofactors, nutrients, and plant growth regulators or hormones.

Plant growth regulators can be defined as compounds or preparations which, in minute amounts, alter the behavior of ornamental or crop plants and/or the products of such plants through physiological (hormonal) rather than physical action. They may either accelerate or retard growth, prolong or break a dormant condition, promote rooting, fruit-set, or increase fruit size or quantity, or affect the growth and/or productivity of plants in other ways. Plant growth regulators are commonly classified into one or more of six categories: auxins, gibberellins, cytokinins, ethylene generators, inhibitors, and retardants. Examples of known auxins include indole acetic acid, 2,4-D (2,4-dichlorophenoxyacetic acid), MCPA (4-chloro-2-methyl phenoxyacetic acid), MCPB (4-[4-chloro-o-tolyloxy]butyric acid) which susceptible plants oxidize to MCPA, and BNOA (beta-napthoxyacetic acid). Gibberellins include gibberellic acid and its derivatives, while cytokinins include compositions such as zeatin, kinetin (6-furfurylamino purine), benzyladenine (6-benzylamino purine or BAP), and benzyl anidene. Known ethylene generators include ethylene and Ethephon (2-chloroethyl)phosphoric acid, while known inhibitors include benzoic acid, gallic acid, and cinnamic acid, and retardants include compositions which are especially useful in plant height control, particularly in commercial greenhouse-grown floricultural crops.

Preparations based on cytokinins, such as kinetin and BAP, are also known to be growth stimulators. However, cytokinin-based preparations have generally been shown to be most effective in combination with auxins. Moreover, relatively little research has been conducted to examine the effects of cytokinins on cotton, and cytokinins have generally been found to have little effect on cotton or have inhibited or even killed the plant.

SUMMARY OF THE INVENTION

I have now discovered a novel process for enhancing the growth and development of cotton. Application of relatively low concentrations of a cytokinin to cotton seed or to a growing cotton plant at a stage of growth between the cotyledon stage and the six-leaf stage, is effective to elicit one or more effects in the resultant, treated plant including reduced apical dominance, increased rate of development of fruiting branches, decreased time to first bloom, increased number of cotton squares formed, thickening of the hypocotyl, reduced rate of leaf wilting, reduced water usage, and increased root development.

In accordance with this discovery, it is an object of this invention to provide an improved process for growing cotton.

It is another object of this invention to provide an improved process for growing cotton with increased yields.

Yet another object of this invention is to provide an improved process for growing cotton with a greater rate of cotton production, allowing growth of cotton in a shorter growing season.

Still another object of this invention is to provide an improved process for growing cotton with reduced water usage, thereby allowing growth under relatively dry conditions with reduced or no irrigation.

Other objects and advantages of this invention will become readily apparent from the ensuing description.

DETAILED DESCRIPTION OF THE INVENTION

Figure 1A:
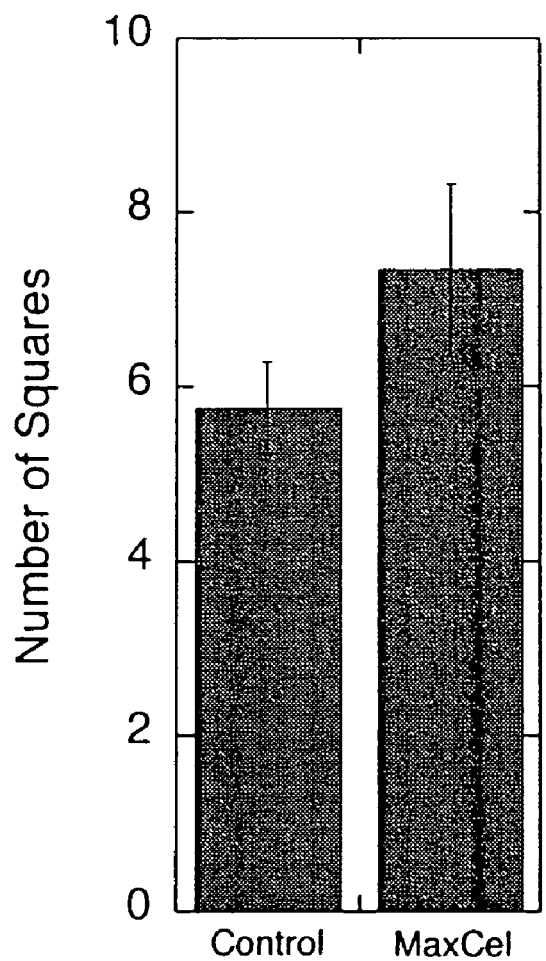
FIGS. 1a and 1b show the increase in the rate of square development after the treatment with 25 ppm 6-benzyladenine.

Cytokinins are an art recognized category of plant hormones which are derivatives of adenine and affect the growth of plants by promoting cell division (cytokinesis) and cell enlargement by swelling. A variety of cytokinins are known in the art, any one of which may be used herein, including cytokinins which are naturally occurring as well as synthetic cytokinin derivatives. The particular cytokinins suitable for use herein may be obtained commercially, recovered from plant material, or synthesized. Synthesized compounds may be tested for cytokinin activity using assays designed to evaluate the promotion of growth in plants (e.g., tobacco bioassays) as is well known in the art (Skoog et al., 1967, Phytochem 6:1169-1192; Morris, 1986, Ann. Rev. Plant Physiol. 37:509-538; Horgan, 1984, in Advanced Plant Physiol, Wilkins, M. B., ed., Pitman Publishing, London, pp. 53-75; Letham and Palni, 1983, Ann. Rev. Plant Physiol 34:163-197; and Chen, 1981, in Metabolism and Molecular Activities of Cytokinins, Guern, J. and Peaud-Lenoel, C., eds., Springer, N.Y., pp. 34-43). Preferred cytokinins include substituted and unsubstituted kinetins, including $N^6$ substituted adenines having either an alkyl or purine substituent. Without being limited thereto, specific examples of cytokinins which may be used herein include 6-benzyladenine (also known as 6-benzylamino purine or BAP, and sold commercially as MAX-CEL by Valent Biosciences Corp.), $N^6$-2 isopentenyl adenine (2iP), isopentenylpyrophosphate (ipp), $N^6$-tetrahydrofurfurylaminopurine, $N^6$-(2-thenylamino)purine, $N^6$-(2-pridylamino)purine, $N^6$-(2-naphthylamino)purine, N⁶-(benzoylamino)purine, benzyl anidene, 6-(4-hydroxy-3-methyl-2-transbutenylamino)purine (zeatin), and 6-furfurylaminopurine (kinetin), with 6-benzylamino purine being particularly preferred.

The process of the invention is effective for enhancing the growth and development of a wide array of cotton varieties of the genus *Gossypium*. To be effective, the cytokinins are applied at a relatively low concentration to cotton seeds or to cotton plants which are at an early stage of development, specifically plants at a stage of growth between (and including) the cotyledon stage and the six-leaf stage. Although cotton seeds possess cotyledons, they are not true leaves. Thus, as it applies to cotton, the cotyledon stage is defined herein as the period when the seedling has emerged from the ground but has not yet generated true leaves. When applied in this manner, the cytokinins unexpectedly elicit one or more or all effects including: reduced apical dominance, increased rate of development of fruiting branches (from the axillary meristems), decreased time to first bloom, increased number of cotton squares formed (i.e., increased boll development, wherein square refers to the flower bud of a cotton plant with a central corolla containing the pollen anthers and sepals and surrounded by three or sometimes four bracts), thickening of the hypocotyl, reduced rate of leaf wilting, reduced water usage without a significant reduction in plant growth (measured by reduced cuticular transpiration), and increased root development, such as enhanced lateral root branching and/or root length. These effects are significant after a single application. Surprisingly, these effects are most evident in cotton grown in geographical areas wherein the availability of water to the plant (from rainfall or provided through irrigation) is normally substantially below that necessary for optimal growth, and thus the plants are subjected to water deficit stress. Moreover, these effects generally become less pronounced as the availability of water is increased and the cotton plants are subjected to less water stress. As used herein, plant water stress may be measured using techniques conventional in the art, such as measures of leaf water potential (Fisher D B, Cash-Clark CE, 2000, Gradients in water potential and turgor pressure along the translocation pathway during grain filling in normally watered and water-stressed wheat plants. Plant Physiol 123: 139-148) or elevated leaf temperatures (Leinonen I, Jones H G, 2004, Combining thermal and visible imagery for estimating canopy temperature and identifying plant stress. J Exp Bot 55: 1423-1431). This process therefore enables cotton to be grown with increased yields in water limited environments with no or reduced use of irrigation.

The potency of the cytokinins dictated that they should be applied in conjunction with an agronomically acceptable inert carrier or vehicle as is known in the art. As a practical matter it is envisioned that compositions of the cytokinins will be prepared from commercially available pure, substantially pure, or concentrated cytokinins (or mixtures thereof) that are formulated as an emulsion in an inert liquid phase carrier or diluent such as water. Preferred compositions are prepared as aqueous emulsions of cytokinins. Although water is the preferred carrier, it is envisioned that other carriers may also be used, including but not limited to, oils, alcohols, inert solids such as talc, vermiculite, silicates, kaolin, cellulose or sugars, and wettable powders. The cytokinins may be optionally further formulated with one or more conventional additives, such as emulsifiers, surfactants, wetting agents, UV stabilizers, preservatives, antioxidants, adherents, herbicidal agents, fungicidal agents, and insecticidal agents, with use of emulsifiers or surfactants being preferred for use in aqueous formulations. However, the cytokinins are preferably used in the substantial absence of a plant affecting amount of other plant growth regulators or plant hormones. The term plant growth regulator or hormone as used herein refers to a naturally occurring or synthetic compound that acts as a hormone in regulating plant growth, such as auxins, gibberellins, brassinolides, and their derivatives, as well as ethylene generators.

Compositions of the cytokinins may be applied, for example, in the form of directly sprayable solutions, powders, suspensions (including high-percentage aqueous, oily or other suspensions), dispersions, emulsions, oil dispersions, pastes, dusts, broadcasting agents or granules, by spraying, atomizing, dusting, broadcasting, watering or dipping (primarily for seeds). Under cultivation conditions, the cytokinins are applied to the locus of the plants growing in the field (i.e., in vivo), preferably on the shoots, stem, cotyledons, and/or foliage (leaves). Seeds are typically treated prior to or concurrent with planting, such as by dipping, spraying or otherwise contacting the seed with a formulation of the cytokinin.

As described above, the cytokinins enhance cotton growth and development by eliciting one or more effects including: reduced apical dominance, increased rate of development of fruiting branches, decreased time to first bloom, increased number of cotton squares formed, thickening of the hypocotyl, reduced rate of leaf wilting, reduced water usage without a significant reduction in plant growth, and increased root development. The amount of the cytokinin that is effective is critical, and is selected to induce one or more of these responses as determined by routine testing. An effective amount is defined herein as that amount which will result in a significant change in the selected response in a test group as compared to an untreated control. For example, where the ultimate effect is reduced apical dominance, decreased time to first bloom, reduced rate of leaf wilting, or reduced water usage (without a significant reduction in plant growth), an effective amount is defined as those quantities which will result in a significant decrease in apical dominance, time to first bloom, rate of leaf wilting, or water usage, respectively, in a test group as compared to an untreated control. Conversely, where the ultimate effect is increased rate of development of fruiting branches, increased number of cotton squares formed, thickening of the hypocotyl, or increased root development, an effective amount is defined as those quantities which will result in a significant increase in the rate of development of fruiting branches, number of cotton squares formed, hypocotyl thickness, or root development, respectively, in a test group as compared to an untreated control. However, the amount of cytokinin should be less than that which may cause significant harm or damage to the plant, such as leaf burns. The actual effective amount will vary with the growth stage of the cotton plant or seed, environmental conditions, the application technique, and the formulation, and may be readily determined by the practitioner skilled in the art. Specifically, we have found that effective amounts of applied cytokinin may be highest for seeds, and decrease as the stage of growth of the plant advances. Thus, without being limited thereto, for the treatment of plants at the 2-, 4-, or 6-leaf stage, single pass spray applications of aqueous cytokinin formulations containing from about 10 ppm up to about 100 ppm cytokinin are effective, with about 10 to about 50 ppm being preferred, and about 20 to about 30 ppm being particularly preferred. In contrast, for the treatment of plants at the cotyledon stage of growth, single pass spray applications of aqueous cytokinin formulations containing from about 10 ppm up to about 400 ppm cytokinin are effective, with about 100 to about 300 ppm being preferred, and about 100 to about 200 ppm being particularly preferred. When treating seeds the amount of cytokinins may be higher still, and cytokinin formulations containing from about 500 ppm up to about 2,000 ppm cytokinin are effective, with about 700 ppm to about 1,000 ppm being preferred (seeds soaked in an aqueous formulation for approximately 10 seconds). Expressed as the amount of cytokinin per acre, for the treatment of plants at the 2-, 4-, or 6-leaf stage, effective application rates may range from about 0.3 g cytokinin/acre up to about 3.75 g/acre, with about 0.3 g/acre up to about 1.9 g/acre being preferred, and about 0.75 g/acre up to about 1.2 g/acre being particularly preferred. Similarly, for the treatment of plants at the cotyledon stage, effective application rates may range from about 0.3 g cytokinin/acre up to about 15 g/acre, with about 3.75 g/acre up to about 11.25 g/acre being preferred, and about 3.75 g/acre up to about 7.5 g/acre being particularly preferred. Application of amounts greater than 100 ppm to plants at the 2-, 4-, or 6-leaf stage, or greater than 400 ppm to plants at the cotyledon stage, may harm the plant, including causing leaf burns, while amounts of 5 ppm or less are not effective.

The following examples are intended only to further illustrate the invention and are not intended to limit the scope of the invention that is defined by the claims.

EXAMPLE 1

Cotton plants were treated with cytokinins in greenhouse conditions to evaluate the effects of cytokinin application. All plants in the treatment groups received a single application by spraying of 25 ppm 6-benzyladenine (MaxCel) at the cotyledon stage, one week after planting. Hypocotyl thickness was measured 1 inch above the soil surface one week after spraying, while cotton squares were counted 24 and 38 days after spraying.

To evaluate water usage, treated and control cotton plants were planted in 1-gallon pots containing equal soil volumes. Each plot was saturated with water 24 hours prior to treatment of the seedling with 25 ppm MaxCel at the cotyledonary stage. The pots were sealed in a gas permeable bag that permitted water loss only through the plant. Water use was analyzed 13 days after treatment.

Figure 1B:
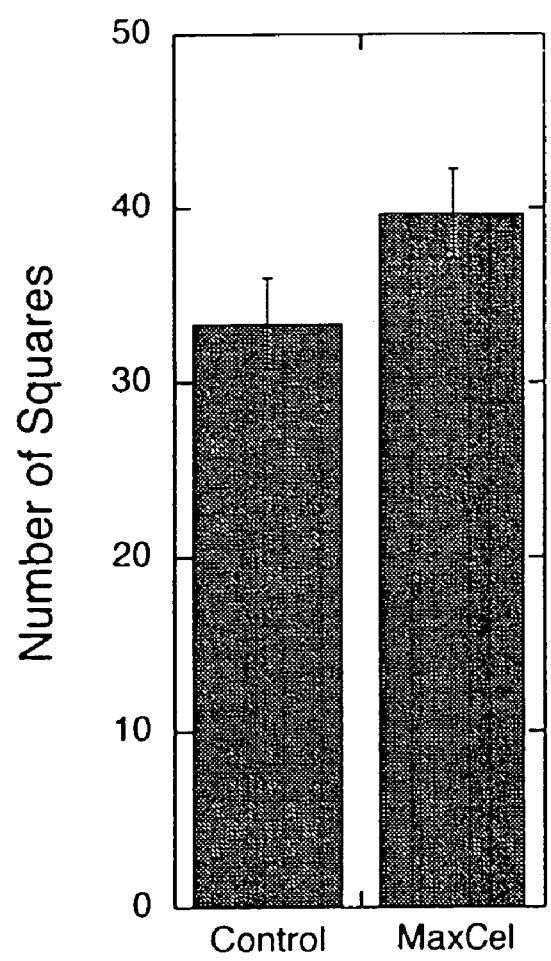
Figure 2:
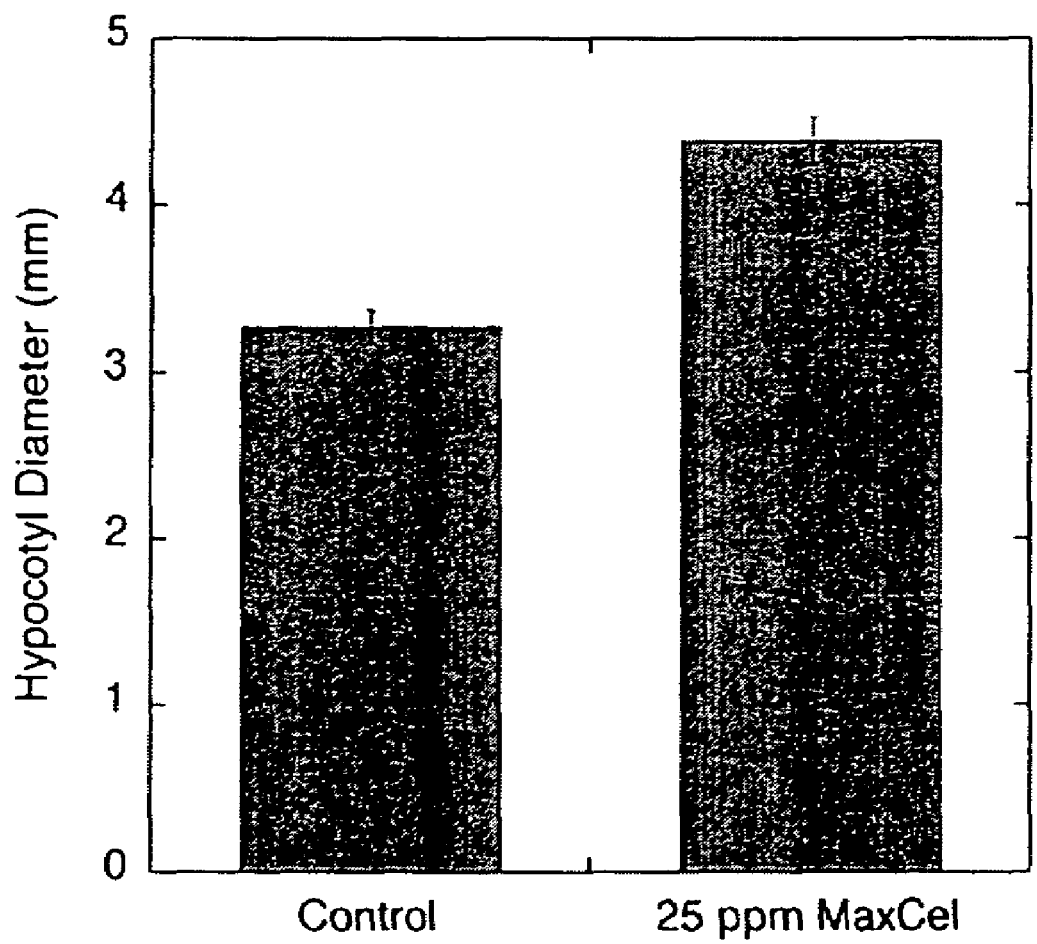
FIG. 2 shows the thickening of the hypocotyl after the treatment with 25 ppm 6-benzyladenine.
Figure 3:
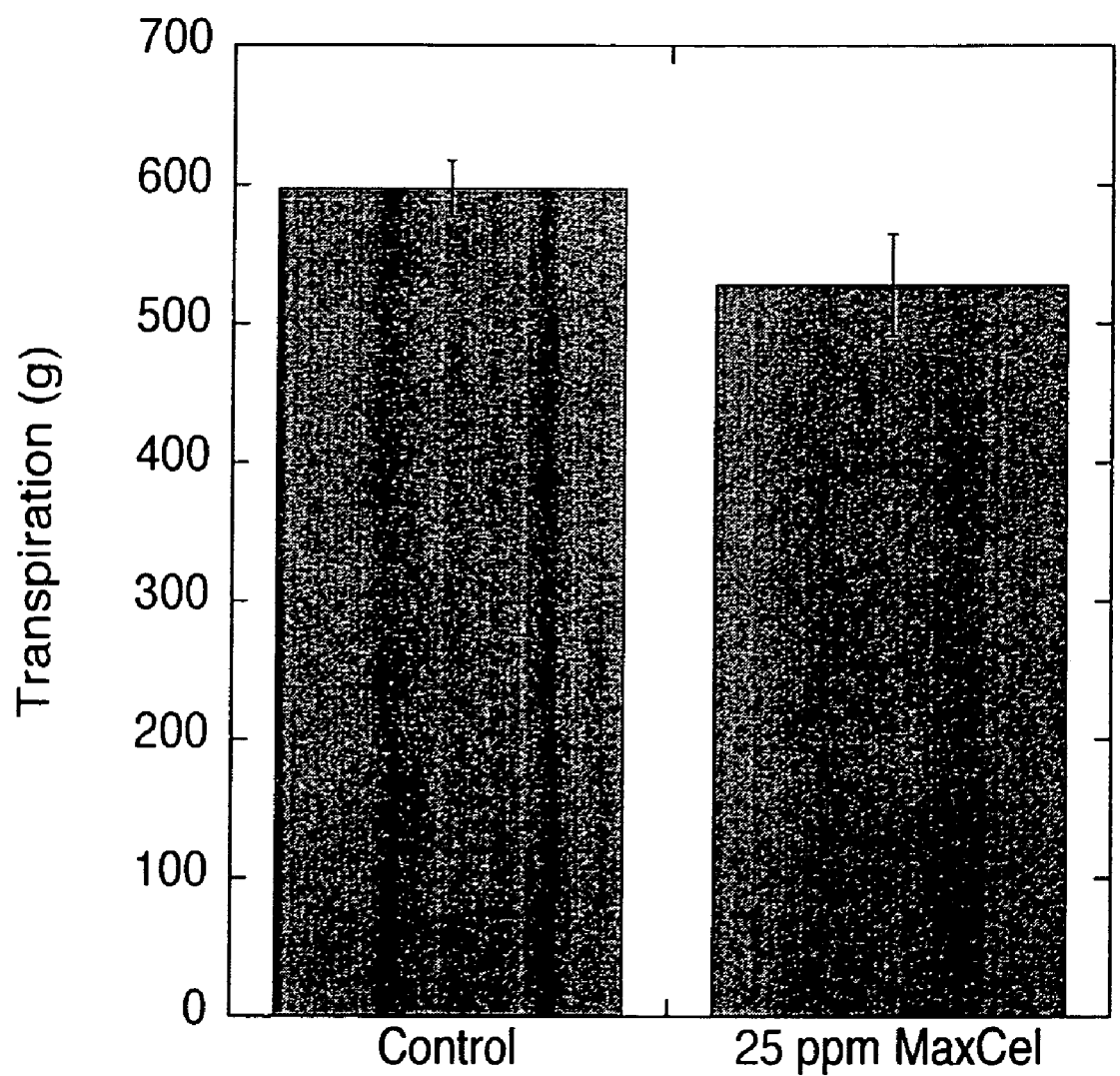
FIG. 3 shows the reduction in water usage measured by transpiration after the treatment with 25 ppm 6-benzyladenine.

The results are shown in FIGS. 1-3. In all bar graphs, cytokinin treated cotton varieties are shown in black, while untreated controls are shown in white. As shown in FIG. 1, treated cotton plants exhibited significantly increased cotton squares on both day 24 (FIG. 1a) and day 38 (FIG. 1b). Plant mapping showed a 15 to 20% increase in the development of squares that was maintained between the two mapping dates. Enhanced branching from the axillary meristems in the MaxCel treated plants was also observed. FIG. 2 shows the measured hypocotyl diameter of the control and treated plants. MaxCel treated plants exhibited a significantly thicker hypocotyl. FIG. 3 shows the results of cytokinin treatment on water usage. Water usage (measured as transpiration) was significantly less in the cytokinin treated plants without a reduction in plant development.

EXAMPLE 2

The effects of cytokinins on field grown cotton were measured under both moderate water stress and under well-watered conditions.

Figure 4:
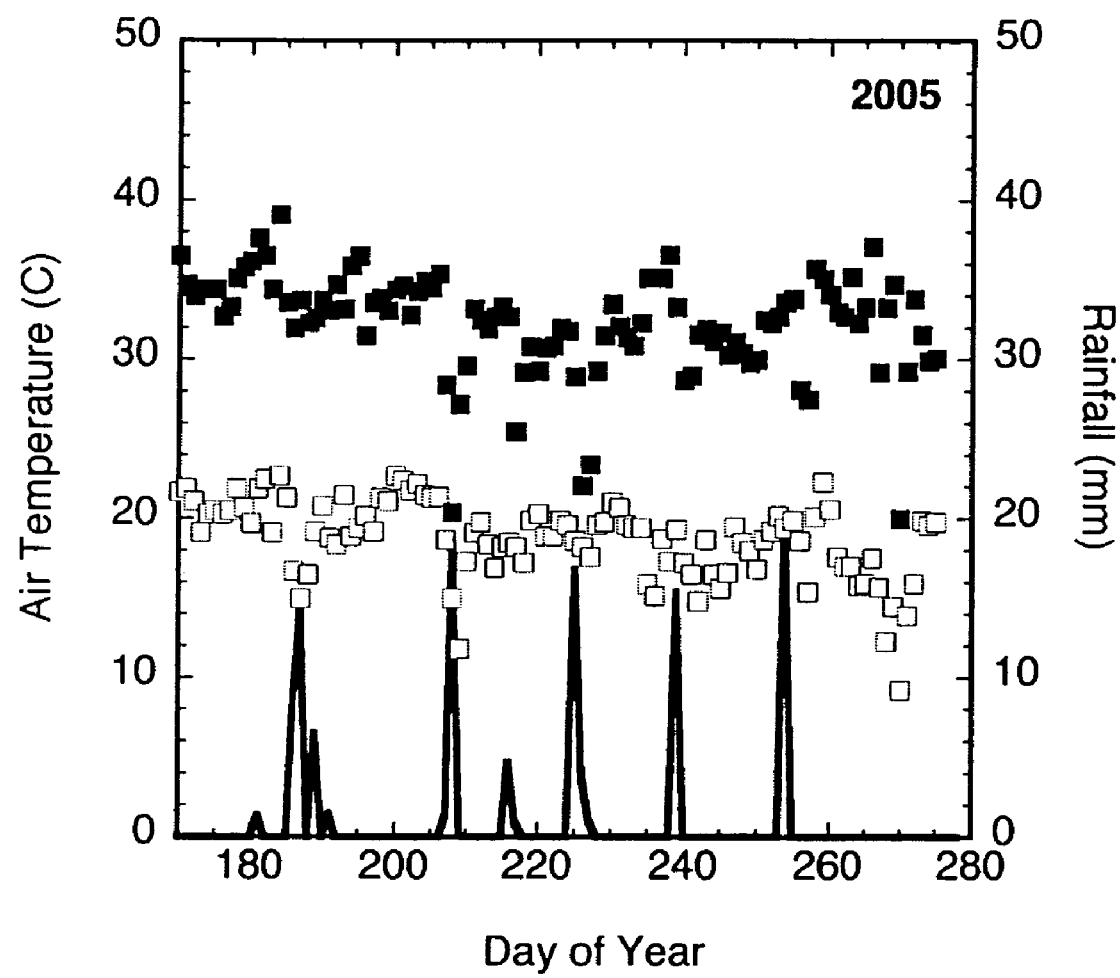
FIG. 4 shows the maximum and minimum air temperatures and rainfall data during the field trials of Example 2.

The conventional tilled plots were treated with Prowl (1 quart per Acre) on Day of Year 109 for weed control. Four -61 meter rows of FM800, DP444, Suregrow 215 RR/BG, and FM989 cotton varieties were planted in a North-South orientation per replication on Day of Year 158 using a John Deere 7300 MaxEmerge 2 VacuMeter Planter. Twelve replications were planted with six replications only receiving rain after planting and six replications fully irrigated. The seedlings were sprayed on day of year 171 with a single treatment 25 ppm MaxCel on six of the twelve replications (3 dryland and 3 irrigated) at the cotyledon first leaf stage. The irrigated plants received 5 mm of water per day from underground drip lines located on 1 m centers. Pix (16 ounces per Acre) was sprayed over the irrigated crop on Day of Year 206. The plots were sprayed with Ginstar (12 ounces per Acre) on Day of Year 280, and the plots were harvested on Day of Year 306. The maximum and minimum air temperatures and rainfall data throughout the growing season are shown in FIG. 4. Significant rainfall events approximately every 2 weeks prevented "severe" water deficit stress in the dryland plots.

Three 3-meter samples were harvested by hand for each replicate plot from row 3 of the 4-row plot (9 samples total per treatment). The plot stripper harvested cotton was obtained from a 6-meter sample from row 1 of the 4-row plots (3 samples total per treatment).

Figure 5:
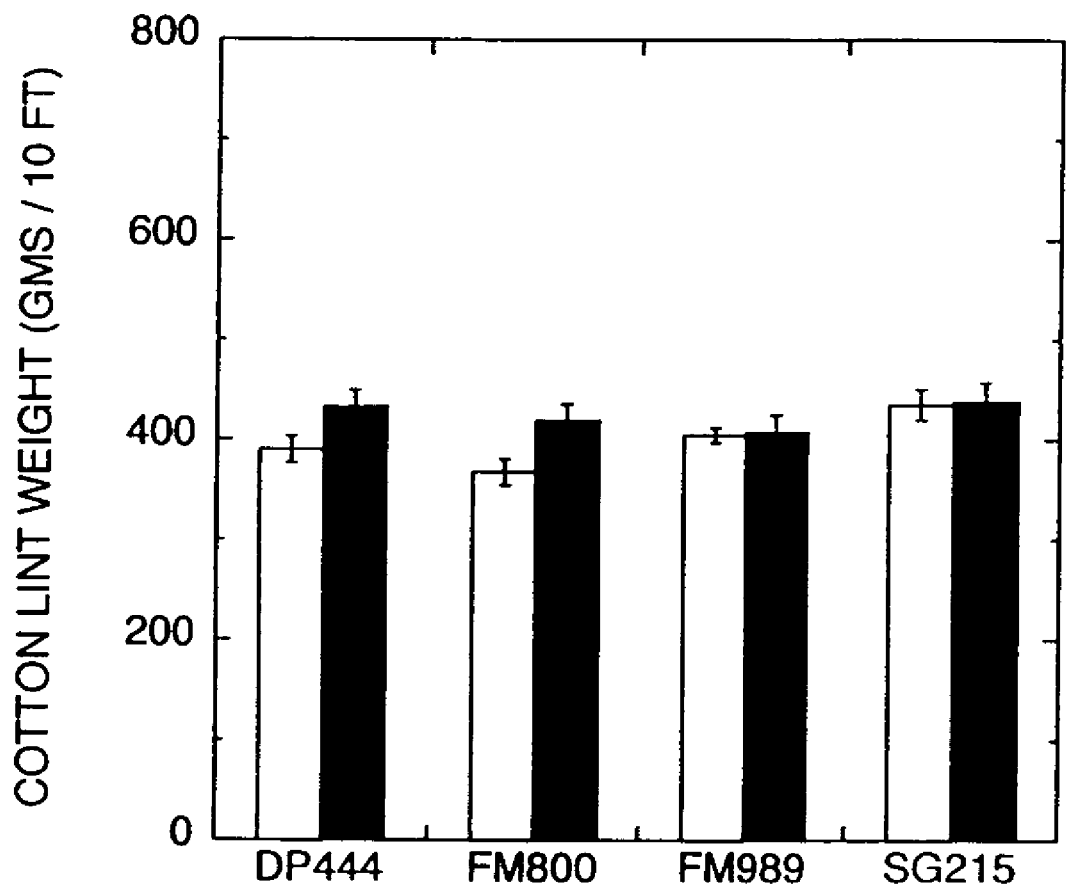
FIG. 5 shows the yield levels measured as cotton lint weight in cotton grown in Example 2 without irrigation.
Figure 6:
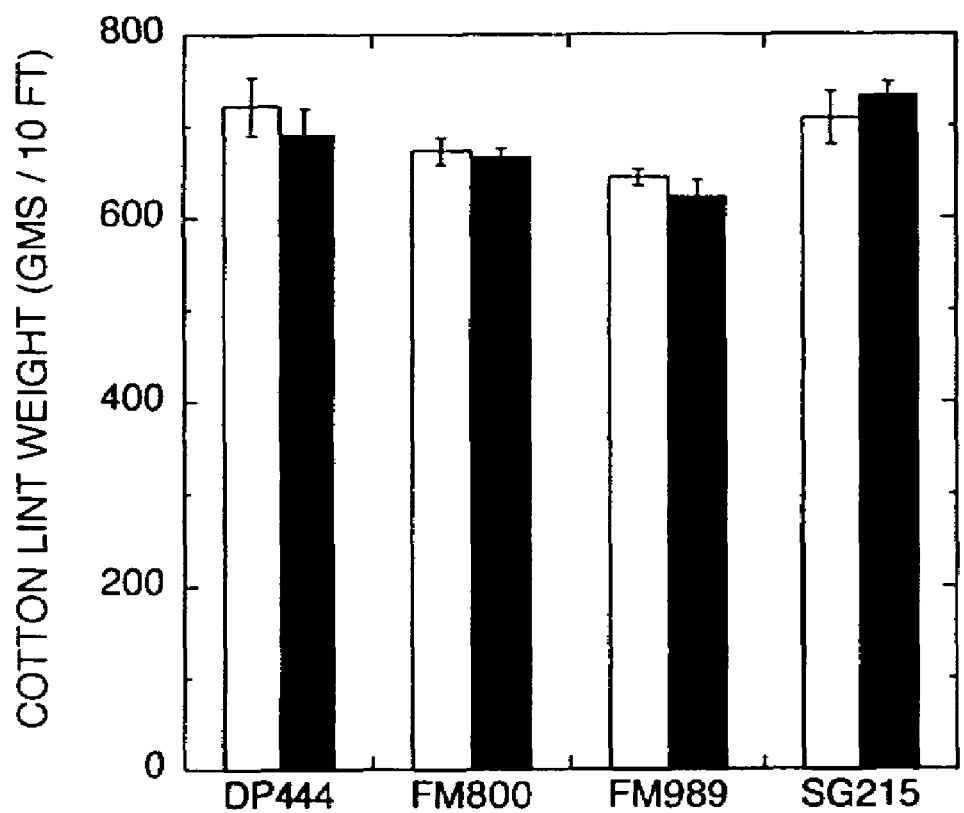
FIG. 6 shows the yield levels measured as cotton lint weight in cotton grown in Example 2 with subsurface drip irrigation.
Figure 7:
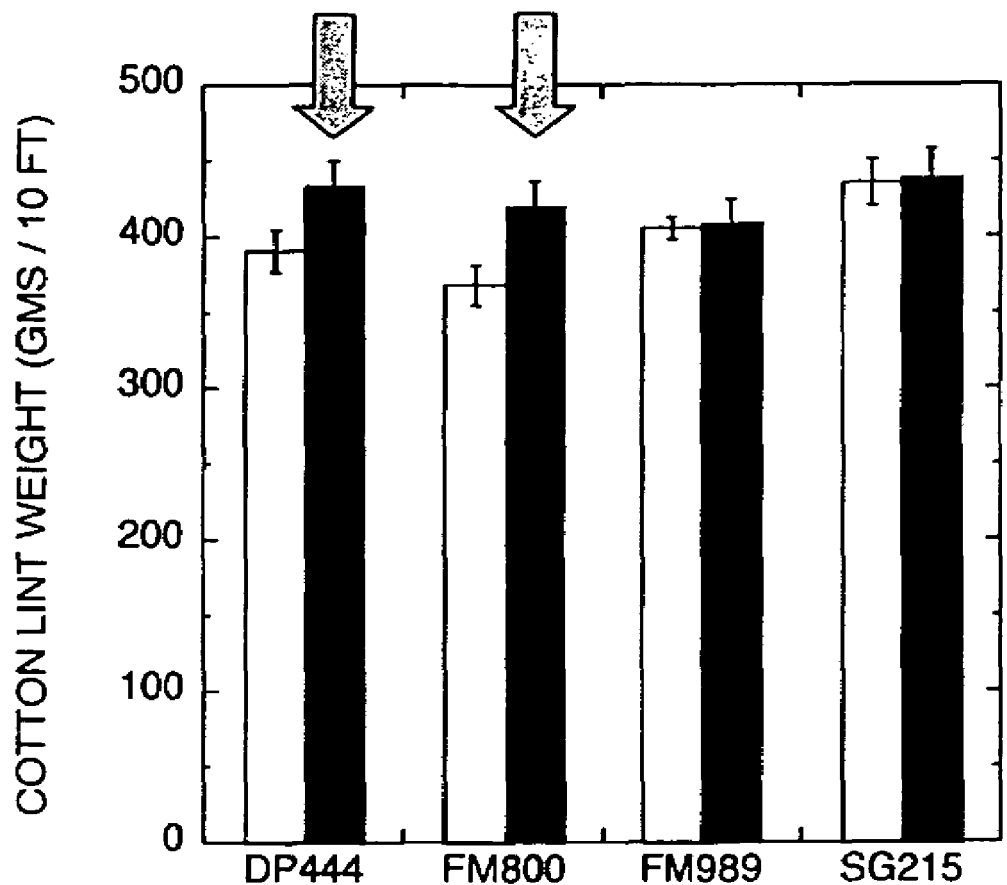
FIG. 7 shows the yield levels measured as cotton lint weight in hand harvested cotton grown in Example 2.
Figure 8:
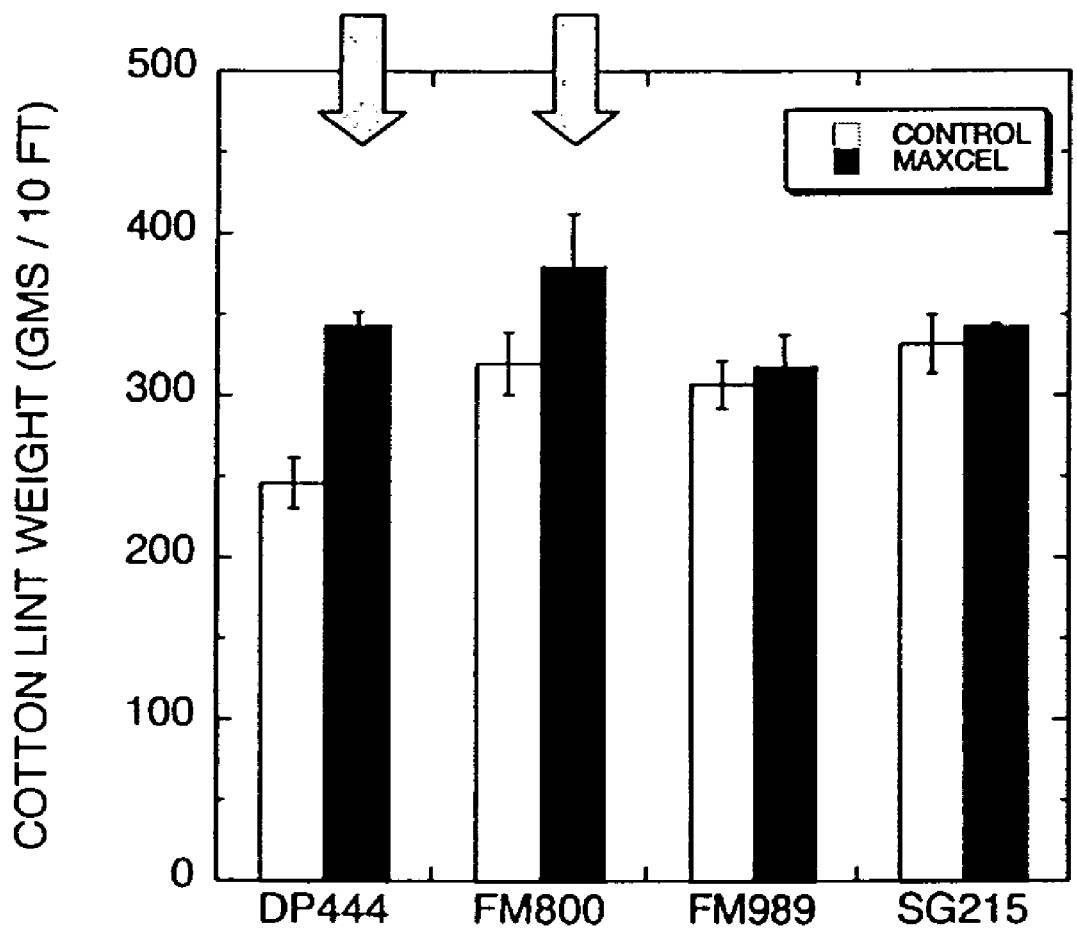
FIG. 8 shows the yield levels measured as cotton lint weight in plot stripper harvested cotton grown in Example 2.

The results are shown in FIGS. 5-8. In all bar graphs, cytokinin treated cotton varieties are shown in black, while untreated controls are shown in white. FIG. 5 shows the results of cotton grown under dryland conditions with no irrigation, while FIG. 6 shows the results of cotton grown with subsurface drip irrigation. Significant yield increases (measured as cotton lint weight) were only observed in the dryland plots. FIGS. 7 and 8 show the results of hand and plot stripper harvested cotton, respectively, from the dryland plots. Both the DP444 and FM800 varieties showed highly significant yield increases.

It is understood that the foregoing detailed description is given merely by way of illustration and that modifications and variations may be made therein without departing from the spirit and scope of the invention.

I claim:

1. A process for enhancing the growth and development of cotton comprising applying a cytokinin to cotton seed or a growing cotton plant at a stage of growth between and including a cotton plant at the cotyledon stage up to and including a cotton plant at the six-leaf stage, and further wherein said cytokinin is applied substantially in the absence of other plant growth regulators or plant hormones and said cytokinin is applied at a concentration effective to elicit one or more effects in the cotton plant selected from the group consisting of reduced apical dominance, increased rate of development of fruiting branches, decreased time to first bloom, increased number of cotton squares formed, thickening of the hypocotyl, reduced rate of leaf wilting, reduced water usage, and increased root development, all in comparison to an untreated control.

2. The process of claim 1 wherein said cytokinin is applied to said growing cotton plant and said concentration of cytokinin is between about 10 ppm to about 400 ppm.

3. The process of claim 2 wherein said cotton plant is at a two-, four-, or six-leaf stage, and said concentration of cytokinin is between about 10 ppm to about 100 ppm.

4. The process of claim 3 wherein said concentration of cytokinin is between about 10 ppm to about 50 ppm.

5. The process of claim 4 wherein said concentration of cytokinin is between about 20 ppm to about 30 ppm.

6. The process of claim 2 wherein said cotton plant is at a cotyledon stage, and said concentration of cytokinin is between about 10 ppm to about 400 ppm.

7. The process of claim 6 wherein said concentration of cytokinin is between about 100 ppm to about 300 ppm.

8. The process of claim 7 wherein said concentration of cytokinin is between about 100 ppm to about 200 ppm.

9. The process of claim 1 wherein said cytokinin is applied to said cotton seed and said concentration of cytokinin is between about 500 ppm to about 2,000 ppm.

10. The process of claim 9 wherein said concentration of cytokinin is between about 700 ppm to about 1,000 ppm.

11. The process of claim 1 wherein said cytokinin is 6-benzyladenine.

12. The process of claim 1 wherein said cotton plant is subjected to water deficit stress.

13. The process of claim 1, wherein said cytokinin is applied in vivo, at a location on said growing cotton plant selected from the group consisting of a shoot, stem, cotyledon, and foliage.

14. The process of claim 1, wherein said cotton plant is grown in the absence of a significant amount of irrigation.

15. The process of claim 1 wherein said concentration of said cytokinin is less than that effective to significantly damage said cotton plant.

16. A process for enhancing the growth and development of cotton comprising applying a composition comprising a plant growth regulator to cotton seed or a growing cotton plant at a stage of growth between and including a cotton plant at the cotyledon stage up to and including a cotton plant at the six-leaf stage, and further wherein said plant growth regulator consists of a cytokinin, said cytokinin being applied at a concentration effective to elicit one or more effects in the cotton plant selected from the group consisting of reduced apical dominance, increased rate of development of fruiting branches, decreased time to first bloom, increased number of cotton squares formed, thickening of the hypocotyl, reduced rate of leaf wilting, reduced water usage, and increased root development, all in comparison to an untreated control.

17. The process of claim 16 wherein said cytokinin is applied to said growing cotton plant and said concentration of cytokinin is between about 10 ppm to about 400 ppm.

18. The process of claim 17 wherein said cotton plant is at a two-, four-, or six-leaf stage, and said concentration of cytokinin is between about 10 ppm to about 100 ppm.

19. The process of claim 17 wherein said cotton plant is at a cotyledon stage, and said concentration of cytokinin is between about 10 ppm to about 400 ppm.

20. The process of claim 16 wherein said cytokinin is applied to said cotton seed and said concentration of cytokinin is between about 500 ppm to about 2,000 ppm.

21. The process of claim 16 wherein said cotton plant is subjected to water deficit stress.

22. The process of claim 16, wherein said cytokinin is applied in vivo, at a location on said plant selected from the group consisting of a shoot, stem, cotyledon, and foliage.

23. The process of claim 16, wherein said cotton plant is grown in the absence of a significant amount of irrigation.

24. The process of claim 16 wherein said concentration of said cytokinin is less than that effective to significantly damage said cotton plant.

25. The process of claim 16 wherein said cytokinin is applied in the absence of other plant growth regulators or plant hormones.

* * * * *